Feb. 11, 1964     D. H. LANCTOT     3,121,207
WAVEGUIDE SHUTTER UTILIZING FLEXABLE SHUTTER
VANES FLEXED BY ELECTROMAGNET
Filed June 11, 1962
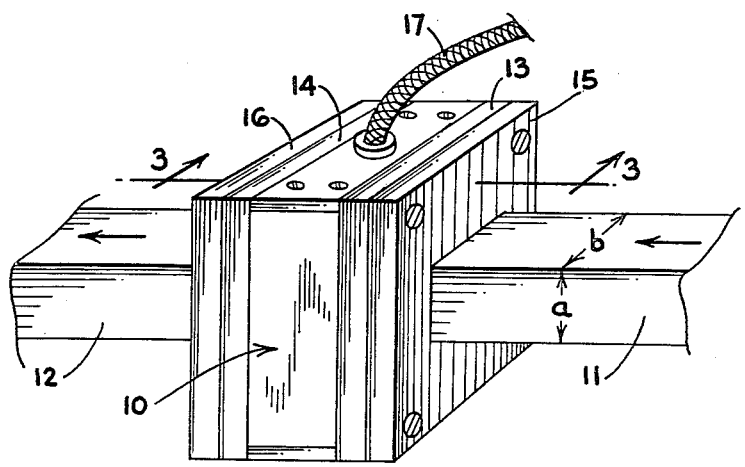
FIG. 1
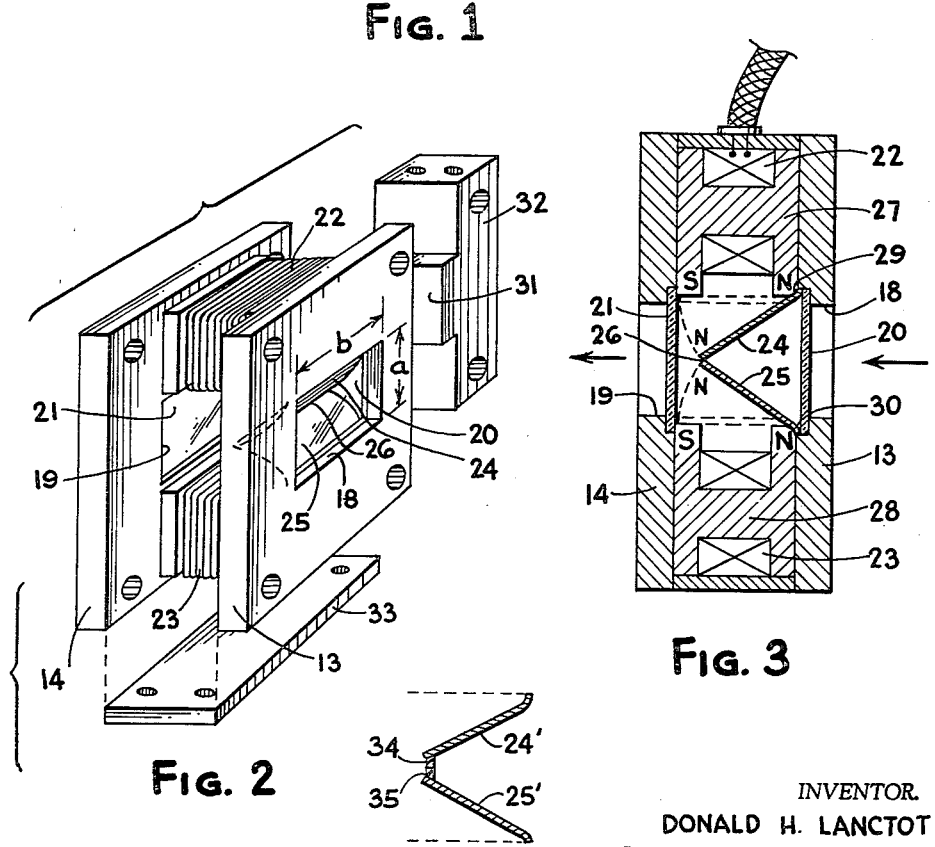
FIG. 2
FIG. 3
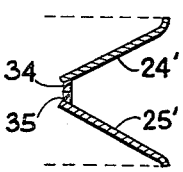
FIG. 4
INVENTOR.
DONALD H. LANCTOT
BY *Elliott & Pastoriza*
ATTORNEYS

United States Patent Office 3,121,207
Patented Feb. 11, 1964

3,121,207
WAVEGUIDE SHUTTER UTILIZING FLEXABLE SHUTTER VANES FLEXED BY ELECTROMAGNET
Donald H. Lanctot, Malibu, Calif.; Jeanette Lanctot, executrix of Donald H. Lanctot, deceased, assignor to Lantronics, Inc., Santa Monica, Calif., a corporation of California
Filed June 11, 1962, Ser. No. 201,572
10 Claims. (Cl. 333—98)

This invention relates generally to waveguide components and more particularly to an improved waveguide shutter for closing off or attenuating electromagnetic energy passed through waveguides.

Waveguide shutters or cutoff switches have been proposed heretofore. For example, in guides leading to transmitting and receiving antennae as in radar applications, it is desirable to shut off or close the receiving antenna waveguide during a transmitting period to protect components such as crystals in the receiving set from the transmitted pulses. Such waveguide shutters or switches as have been proposed, however, have not only been relatively expensive and bulky, but more importantly, will not pass the full band width of energy of which the waveguide is capable of carrying.

A further characteristic of present day waveguide shutter structures is the relatively slow response time in operating from an open waveguide position to a closed waveguide position. Because actual physical elements are employed to effect the desired shutter action, there is necessarily mechanical inertia involved. Further, the interposing of mechanical type members in a waveguide, as in present day structures, usually results in discontinuities, either in the form of cavities or protuberances into the waveguide passage so that when the shutter is in open condition, there are not presented smooth waveguide passage walls.

With all of the foregoing in mind, it is a primary object of this invention to provide a greatly improved waveguide shutter in which many of the foregoing problems are overcome.

More particularly, it is an object to provide a waveguide shutter which is compact, economical to manufacture, and simple in construction as compared to prior art structures.

Another important object is to provide an improved waveguide shutter in which the full band width of the waveguide can be passed through the shutter when the shutter is in open condition.

Another object is to provide an improved waveguide shutter in which relatively smooth waveguide passage walls are provided when in the open position with a minimum of protuberances or cavities to the end that the aforementioned object of full band width utilization is realizable.

Another object of this invention is to provide an improved waveguide shutter which is extremely high speed in operation.

Still another object is to provide a waveguide shutter which is fail-safe in that it will automatically assume a closed position in the event of a power failure.

Another object of this invention is to provide an improved waveguide shutter which may be operated from remote locations by electromagnetic means and in which such electromagnetic means consumes relatively little power.

Still another object is to provide a waveguide shutter which may be readily modified to provide a partial wave attenuator.

Briefly, these and many other objects and advantages of this invention are attained by providing a block structure having entrance and exit openings for connection to input and output waveguides. The block structure itself incorporates flexible vane means in the form of vane elements of thin conducting material having edges secured to opposite edges of the entrance opening in the block structure. The free ends of the vanes are in engagement with each other when in a first position to define a V-shape closing off communication between the entrance and exit openings. The block structure also incorporates electromagnetic means for flexing the vane elements away from each other to a second position wherein the vane elements themselves define opposite walls of a waveguide passage between the entrance and exit openings. De-energization of the coils will permit the vanes by their own natural resiliency to return to their initial position so that a fail-safe structure is provided.

As a consequence of employing the vanes themselves as a part of the waveguide passages when in the second or open position, a relatively smooth waveguide passage is provided so that the full band width of the waveguide is utilized.

The entire structure is mechanically simple in construction and may be manufactured extremely economically as compared to devices for performing equivalent functions presently available.

A better understanding of the invention as well as its various features and objects as set forth will be had by now referring to a preferred embodiment thereof as illustrated in the accompanying drawings, in which:

FIGURE 1 is a perspective view of the waveguide shutter positioned between input and output waveguides;

FIGURE 2 is an exploded perspective view of some of the basic elements making up the waveguide shutter illustrated in FIGURE 1;

FIGURE 3 is a cross section of the shutter taken in the direction of the arrows 3—3 of FIGURE 1; and FIGURE 4 is a fragmentary cross section illustrating a modified form of certain components incorporated in the structure of FIGURE 3.

Referring first to FIGURE 1, there is shown a waveguide shutter comprising a block structure 10 connected to input and output waveguides 11 and 12 by means of flange plates 13 and 14 secured to waveguide flanges 15 and 16, respectively. A shutter mechanism within the block structure 10 is arranged to be actuated by electromagnets through a lead-in conductor cable 17.

In the operation of the device of FIGURE 1, when no signal is received on the lead 17, the input waveguide is completely isolated from the output waveguide. In the presence of any signal on the input lead 17, the waveguides 11 and 12 are connected over the full band width of the guides as determined by their "$a$" and "$b$" dimensions. The manner in which this operation is effected will be evident by now referring to FIGURES 2 and 3.

In FIGURE 2, the waveguides and flanges 15 and 16 are omitted. The flange plates 13 and 14 are shown provided with entrance and exit rectangular shaped openings 18 and 19. These entrance and exit openings may be covered with windows 20 and 21 transparent to electromagnetic energy.

Disposed between the upper and lower portions of the flange plates 13 and 14 are electromagnetic coils 22 and 23, respectively. These coils are arranged to move or flex vane means in the form of two vane elements 24 and 25 defining a V-shape with free end edges in engagement as indicated at 26. Referring to FIGURE 3, the coils 22 and 23 are wound on iron cores 27 and 28 having pole pieces N and S disposed adjacent the upper edges of the entrance and exit windows 18 and 19 and disposed adjacent the lower edges of the entrance and exit windows 18 and 19, respectively. The positioning of these poles is such that when the coils 22 and 23 are energized, the vanes 24 and 25 will serve to complete the flux paths between the poles and will snap to the positions illustrated in dotted lines wherein they will define the upper and lower walls of a waveguide passage between the entrance and exit openings. De-energization of the coils will result in the vanes 24 and 25 flexing to a first position in which their free ends are in engagement as at 26 and as illustrated in solid lines in FIGURE 3.

The fixed edges of the flexible vanes are secured to the upper and lower edges of the entrance opening 18 as indicated at 29 and 30 in such a manner that the vanes may flex about a small radiused portion on the north poles of the magnetic structures 27 and 28. Each vane itself is extremely thin; of the order of .001 inch, and thus is very light and easily flexed.

Because of the polarity of the magnetic structures 27 and 28 as indicated by the letters N and S, the free edges of the vanes 25 and 26 will normally be magnetized as like poles, or as in the example chosen, north poles. They will thus have a natural tendency to repel each other. This repelling force, however, is less than the natural resilient force tending to hold the vanes 25 and 26 together in the absence of any energization of the coils 22 and 23.

Referring again to FIGURE 2, the sides of the waveguide passage between the entrance and exit openings 18 and 19 are defined by raised surfaces such as 31 on end blocks such as indicated at 32. The other end block is not shown but is identical in structure. The raised or stepped forward portion 31 is dimensioned vertically to correspond with the shorter "a" dimension of the rectangular waveguide. The small upper and lower shoulders defined by the forwardly extending surface 31 in turn serve to seat the corners or edges of the pole pieces N and S. The entire structure may be completed by upper and lower end plates such as indicated at 33 in the exploded view of FIGURE 2. The upper end plate is not shown to avoid obscuring the drawing. Suitable screw openings are provided in the various pieces to assemble the device.

FIGURE 4 illustrates a modified type of flexible vane wherein the free edges of the vanes 24' and 25' illustrated in FIGURE 4 terminate in Teflon spacers 34 and 35, respectively. With this arrangement, there is provided a small communication opening between the entrance and exit openings in the block structure when the Teflon bearings are used so that rather than complete closing action, a desired degree of attenuation only of the energy passed through the input and output waveguides will be effected. This degree of attenuation may be varied by varying the spacing thickness of the Teflon portions 34 and 35 secured to the vanes to thereby limit their closing. It is thus evident that the shutter structure may be employed to provide a partial attenuation. It should also be understood that the vanes themselves may be provided with a resistive coating when used as illustrated in FIGURE 4 to provide a desired attenuating characteristic.

An important feature of this invention is the manner in which the vanes are dimensioned to provide a V-shape to oncoming electromagnetic energy when in the closed position as illustrated in FIGURE 3. This V-shape results in a termination impedance such as to minimize the generation of standing waves in the input waveguide. Further, the dimensioning is such that when the vane elements 24 and 25 are actuated to their second position, they will constitute the upper and lower waveguide walls which, in cooperation with the raised surface portions such as indicated at 31 in FIGURE 2 for the spacer end blocks, define a smooth waveguide passage in perfect registration with the input and output waveguides 11 and 12. There is thus minimized any protuberances or crevices in the shutter structure itself.

The operation of the improved waveguide shutter of this invention will be evident from the foregoing description. The flange plates 13 and 14 are designed for mating engagement with conventional rectangular waveguide flanges such as indicated at 15 and 16 in FIGURE 1. Therefore, the connection of the shutter structure in any waveguide plumbing system is extremely simple. The thickness of the block structure itself is relatively small compared to equivalent structures so that a minimum of space is taken up by the waveguide shutter. The windows 20 and 21 described in conjunction with FIGURES 2 and 3 maintain the interior of the shutter structure dust free for most reliable operation.

With the device assembled, the vane elements 24 and 25 will assume their natural position as illustrated in FIGURE 3 in which their natural resiliency causes their free ends to be in engagement. In this position, and in the absence of any energization of the coils, the input waveguide 11 is completely isolated from the output waveguide 12.

When it is desired to open communication between the waveguides 11 and 12, a small amount of power is applied to the input lead 17 to energize the coils 22 and 23, thereby immediately drawing the vanes 24 and 25 to the dotted line positions illustrated in FIGURE 3. The vanes themselves are of extremely thin conducting material as described and are thus very light and will move extremely rapidly to the dotted line positions shown. The geometry of the iron core flux path for the magnets is such to effect a very rapid action, the like polarization of the free ends of the vanes 24 and 25 serving to help in snapping the vanes apart when the coils 22 and 23 are energized.

As long as the coils 22 and 23 remain energized, the vanes 24 and 25 will define together with the end walls such as 31 a smooth waveguide passage between the entrance and exit openings 18 and 19 for the input and output waveguides 11 and 12. Thus, the full band width of guide energy can be passed, and there will be no cut-off frequencies or other attenuation characteristics which are not also characteristic of the waveguides 11 and 12 themselves.

When it is desired to cut off communication between the input and output guides 11 and 12, the electromagnetic energizing coils are de-energized, and the neutral resiliency of the vanes 24 and 25 will cause them to return to their solid line positions illustrated in FIGURE 3.

It should be noted that the above structure is fail-safe in that any electrical failure in the coils or lead 17 will result in the shutter closing.

In the event it is desired to provide only a given degree of attenuation rather than complete isolation, the Teflon type spacers as described in conjunction with FIGURE 4 may be incorporated in the free end portions of the vanes 24 and 25. The degree of closure can thus be controlled in accordance with the desired level of attenuation between the input and ouput waveguides.

From the foregoing, it will be evident that the present invention has provided a greatly improved waveguide shutter. No only is the mechanical design such that the same may be manufactured relatively economically, but the overall structure is compact and simple to install. Moreover, excellent isolation is effected between the input and output waveguides when the shutter is in closed position and yet when in open position, the full band width of the guides can be utilized. Finally, the response time is extremely rapid in view of the exteremely light physical structure of the vanes themselves.

While only one particular embodiment of the invention has been shown and described, various changes that fall clearly within the scope and spirit will occur to those skilled in the art. The improved waveguide shutter is therefore not to be thought of as limited to the particular details set forth merely for illustrative purposes.

What is claimed is:

1. A waveguide shutter comprising: a body member having entrance and exit openings for input and output waveguides in axial alignment; flexible vane means in the form of at least one thin conducting sheet having one edge secured along one edge of one of said openings and biased to a first position between said entrance and exit openings to attenuate electromagnetic energy passing between said entrance and exit openings; and electromagnetic means for swinging said vane means against its natural resiliency to a second position free of any interference with said electromagnetic energy.

2. A waveguide shutter comprising, in combination: a block structure having entrance and exit openings for connection to input and output waveguides; flexible vane means secured along one edge of said entrance opening in a first position blocking passage of energy between said entrance and exit openings; and means for flexing said vane means against its natural resiliency to a second position free of interference with said energy, cessation of said means for flexing resulting in said vane means returning to said first position.

3. A shutter according to claim 2, in which said vane means includes two vane elements secured respectively to opposite edges of said entrance opening with their free ends in engagement with each other when in said first position to define a V-shape closing off communication between said entrance and exit openings, said vane elements serving to define opposite walls of a waveguide passage between said entrance and exit openings when flexed to said second position.

4. A shutter according to claim 2, including electromagnets positioned in said block structure to move said vane means from said first position to said second position upon energization.

5. A waveguide shutter comprising, in combination: a block structure including first and second flange plates having respectively entrance and exit openings for connection to input and output waveguides; end spacer blocks receivable between said flange plates to define opposite sides of said block structure and opposite waveguide sidewalls between said entrance and exit openings; a pair of vane elements of extremely thin resilient flexible material having edge portions respectively secured to the upper and lower edges of said entrance opening in said first flange plate with their opposite free edges engaging each other when in a first position to define a V-shape with their side edges juxtaposed said opposite waveguide walls defined by said end blocks; and electromagnetic means positioned between the upper and lower portions of said flange plates and end blocks in positions to move said vane elements away from each other upon energization into positions defining top and bottom waveguide walls between said entrance and exit openings, whereby a substantially uniform and continuous waveguide passage is defined between said input and output waveguides.

6. A shutter according to claim 5, in which said electromagnetic means include north and south magnetic poles positioned respectively adjacent the upper edges of said entrance and exit openings and adjacent the lower edges of said entrance and exit openings in positions such that said vane elements complete the flux path between said north and south poles when said electromagnetic means are energized and said vanes move to said second position, the engaging free edges of said vanes having like polarity when said vanes serve as flux carriers so that said engaging edges normally repel each other with a given force less than the natural resilient force of said vanes urging said edges together in the absence of energization of said electromagnetic means.

7. A shutter according to claim 5, including windows transparent to electromagnetic energy closing off said entrance and exit openings.

8. A shutter according to claim 5, in which said engaging free edges of said vanes include insulated spacing means to provide a minor communication opening between said entrance and exit openings whereby electromagnetic energy between said entrance and exit openings is attenuated when said vane elements are in said first position.

9. A shutter according to claim 5, in which said entrance and exit openings are rectangular with said end spacer blocks defining the small dimensioned walls of said waveguide passage and said vane elements being secured along the long dimensioned edges of said rectangular waveguide passage.

10. A shutter according to claim 9, in which said V-shape of said vanes is such as to minimize generation of standing means in said input waveguide when said vanes are in said first position.

References Cited in the file of this patent
UNITED STATES PATENTS

| | | |
|---|---|---|
| 2,917,719 | Brown | Dec. 15, 1959 |
| 3,015,079 | Lanctot | Dec. 26, 1961 |